(12) United States Patent
Han et al.

(10) Patent No.: US 7,964,311 B2
(45) Date of Patent: Jun. 21, 2011

(54) LITHIUM ION SECONDARY BATTERY

(75) Inventors: Won Chull Han, Cheonan-si (KR); Chan Jung Kim, Cheonan-si (KR); Jae Woong Kim, Asan-si (KR); Jun Ho Kim, Asan-si (KR); Jin Hee Kim, Kangbuk-Gu (KR); Ha Young Lee, Cheonan-si (KR)

(73) Assignee: Samsung SDI Co., Ltd, Yongin-si (KR)

( * ) Notice: Subject to any disclaimer, the term of this patent is extended or adjusted under 35 U.S.C. 154(b) by 1616 days.

(21) Appl. No.: 11/283,604

(22) Filed: Nov. 17, 2005

(65) Prior Publication Data

US 2006/0134526 A1 Jun. 22, 2006

(30) Foreign Application Priority Data

Nov. 17, 2004 (KR) .................. 10-2004-0094067

(51) Int. Cl.
*H01M 2/16* (2006.01)
(52) U.S. Cl. ....................... 429/252; 429/251
(58) Field of Classification Search .............. 429/306, 429/316, 326, 129, 139, 185, 251, 252; 210/500.25, 210/650, 503
See application file for complete search history.

(56) References Cited

U.S. PATENT DOCUMENTS

| | | | | |
|---|---|---|---|---|
| 1,673,421 A | * | 6/1928 | Petrie et al. | 429/247 |
| 3,287,112 A | * | 11/1966 | Blaha | 419/2 |
| 3,542,596 A | * | 11/1970 | Arrance | 429/145 |
| 3,694,268 A | * | 9/1972 | Bergum | 29/623.3 |
| 3,703,417 A | * | 11/1972 | Rosa et al. | 429/139 |
| 6,251,540 B1 | | 6/2001 | Kejha | |
| 6,287,720 B1 | | 9/2001 | Yamashita et al. | |
| 6,537,334 B1 | * | 3/2003 | DuPasquier et al. | 29/623.5 |
| 6,627,099 B2 | | 9/2003 | Ono et al. | |
| 6,664,007 B2 | * | 12/2003 | Hamano et al. | 429/306 |
| 6,679,925 B1 | | 1/2004 | Tanizaki et al. | |
| 6,815,123 B2 | | 11/2004 | Sun | |

(Continued)

FOREIGN PATENT DOCUMENTS

DE 199 51 872 5/2001

(Continued)

OTHER PUBLICATIONS

Aguado et al., Calculations of the band gap energy of ionic crystals (Rev. Mex. Fis. 44 1998, 550).*

(Continued)

*Primary Examiner* — Jonathan Crepeau
*Assistant Examiner* — Kenneth Douyette
(74) *Attorney, Agent, or Firm* — Christie, Parker & Hale, LLP

(57) ABSTRACT

A lithium ion secondary battery is provided. The lithium ion secondary battery generally comprises an electrode assembly, a container for accommodating the electrode assembly; and an electrolyte. The electrode assembly comprises two electrodes having opposite polarities and a separator. The separator comprises a porous membrane comprising clusters of ceramic particles. The porous membrane is formed by bonding the particle clusters with a binder. Each particle cluster is formed either by sintering or by dissolving and re-crystallizing all or a portion of the ceramic particles. The ceramic particles comprise a ceramic material having a band gap. Each particle cluster may have the shape of a grape bunch or a lamina, and may be formed by laminating scale or flake shaped ceramic particles.

18 Claims, 2 Drawing Sheets

U.S. PATENT DOCUMENTS

| | | | |
|---|---|---|---|
| 2001/0000485 | A1 | 4/2001 | Ying et al. |
| 2003/0232244 | A1* | 12/2003 | Birke et al. .................. 429/185 |
| 2005/0074669 | A1 | 4/2005 | Park et al. |
| 2006/0046138 | A1* | 3/2006 | Hennige et al. .............. 429/142 |

FOREIGN PATENT DOCUMENTS

| | | | |
|---|---|---|---|
| DE | 103 04 735 A1 | | 7/2004 |
| JP | 07-267613 | | 10/1995 |
| JP | 08-059231 | | 3/1996 |
| JP | 2003-208918 | | 7/2003 |
| JP | 2004-273282 | | 9/2004 |
| KR | 10 2002-0033534 A | | 5/2002 |
| WO | WO 94/20995 | | 9/1994 |
| WO | WO 2004049472 | * | 6/2004 |

OTHER PUBLICATIONS

"Photoluminescence of anatase TiO2 thin films achieved by the addition of ZnFe2O4", Jin et al., Journal of Physics: Condensed Matter, vol. 13, No. 44, L913-918, Nov. 5, 2001.*

"Diatomaceous Earth", Golden Harvest Organics LLC, retrieved from: http://www.ghorganics.com/DiatomaceousEarth.html.*

"Translucent Films of Acrylic Acid Esters—Acrylonitrile copolymers", Leonard et al., Industrial Engineering Chemistry, 1951, vol. 43, No. 11, pp. 2500-2502.*

"Synthesis of Polyacrylonitrile-block-Polystyrene Copolymers by Atom Transfer Radical Polymerization", Lazzari et al., Macromolecular Chemistry and Physics, 2005, 206, 1382-88.*

Crompton, T.R., "Battery Reference Book", Edition 3, Newnes, 2000. ISBN: 075064625X.*

Parker, P., "Exploring Rechargeable Batteries", 1999. Retrieved online on Nov. 1, 2010 from: http://www.hamuniverse.com/batteries.html.*

European Search Report, dated Jan. 20, 2006, for Application No. 05110848.8, in the name of Samsung SDI Co., Ltd.

B. Thorsland et al, "Characterization of Porous AlN Separators for Batteries"; Mat. Res. Soc, Symp. Proc. vol. 431, 1996, pp. 315-321.

H. Kim et al, "Electrochemical and physical properties of composite polymer electrolyte of poly(methyl methacrylate) and poly(ethylene glycol diacrylate)", Journal of Power Sources 124 (2003), pp. 221-224.

EPO Patent Abstracts of Japan for Publication No. 2003208918; Publication date Jul. 25, 2003, in the name of Koji Nishida.

Patent Abstracts of Korea for Publication No. 2002-0033534; Date of publication of application May 7, 2002, in the name of Kuroda Ryuma et al.

* cited by examiner

LITHIUM ION SECONDARY BATTERY

CROSS REFERENCE TO RELATED APPLICATION

This application claims priority to and the benefit of Korean Patent Application No. 2004-0094067, filed on Nov. 17, 2004, in the Korean Intellectual Property Office, the entire disclosure of which is incorporated herein by reference.

FIELD OF THE INVENTION

The present invention relates to lithium ion secondary batteries, and more particularly, to electrode assemblies having functional separator membranes for use in lithium ion secondary batteries.

BACKGROUND OF THE INVENTION

Secondary batteries are rechargeable and can be compact in size and have high capacity. Recently, the demand for portable electronic devices, such as camcorders, portable computers, and mobile phones, has increased, leading to active research into and development of secondary batteries. Representative examples of widely-used secondary batteries include nickel metal hydride (Ni-MH) batteries, lithium (Li) polymer batteries, and lithium ion (Li-ion) batteries.

Since lithium has a small atomic weight, secondary batteries using lithium can have high capacitance per unit weight. However, since lithium readily reacts with water, lithium-based secondary batteries generally use non-aqueous electrolytes. In such lithium-based secondary batteries, there is no water restricting the charging and discharging voltage, enabling electromotive forces of about 3 to 4 V to be obtained. Lithium ion secondary batteries are an example of such lithium-based secondary batteries.

The non-aqueous electrolytes used in lithium ion secondary batteries are generally classified into liquid electrolytes and solid electrolytes. Liquid electrolytes are manufactured by dissolving a lithium salt in an organic solvent. The organic solvent, for example, may be an alkyl carbonate such as ethylene carbonate or propylene carbonate, or may be another organic compound.

One problem with these electrolytes, however, is that they typically have low ion conductivity. To compensate for the low ion conductivity of these electrolytes, the areas of the electrode activation materials have been increased, creating an overlap between the electrodes.

However, increasing the overlap between the electrodes limits battery performance in several ways. For example, the low ion conductivity of the electrolyte causes high internal impedance of the battery, resulting in an increased voltage drop in the battery. In particular, the low ion conductivity of the electrolyte causes a reduction in battery current, thereby also reducing battery power.

In addition, movement of lithium ions is limited by a separator which is positioned between the two electrodes. If the separator is not sufficiently permeable and wettable to the electrolyte, the movement of lithium ions is substantially inhibited. As a result, the electrical properties and performance of the battery may deteriorate.

Therefore, in addition to heat resistance, heat deflection resistance, chemical resistance, and mechanical strength, the cross-sectional pore ratio of the separator and the wettability of the separator to the electrolyte are important characteristics of the separator for determining battery performance. The cross-sectional pore ratio of a porous object (e.g., the separator) is the ratio of pore areas to the area of the cross section.

The separator serves as a safety device for preventing the battery from overheating. If the temperature of the separator increases beyond a predetermined level due to some abnormalities in the battery, the polyolefin-based porous membrane of the separator becomes soft and partially melts. This causes the pores of the porous membrane to close. The pores function as passages for the electrolyte solution, and more specifically, for lithium ions. When the flow of lithium ions stops, the current flow between internal and external portions of the battery becomes blocked, thereby slowing or stopping the temperature increase in the battery.

However, the temperature in the battery can suddenly and continuously increase for any reason, for example external thermal transfer. When the temperature increases for more than a predetermined time interval, the separator may melt and destruct irrespective of the shutdown of the pores. This creates partially melted portions in the separator, and these partially melted portions may cause the two electrodes of the battery to be in contact with each other, thereby forming a short circuit. Alternatively, the separator may contract, creating contracted portions in the separator. These contracted portions may also cause the two electrodes of the battery to be in contact with each other, forming a short circuit. Short circuits cause serious harm to the battery.

In a high capacitance secondary battery, a large amount of current can flow over a short period of time. When excessive current flows in such a battery, the temperature in the battery cannot be decreased by shutting down the pores of the separator and blocking current flow. Furthermore, the heat generated by such excessive current flow may cause the separator to continue to melt and destruct. As a result, a short circuit due to the destruction of the separator becomes increasingly possible.

Although blocking the current flow by shutting down the pores of the separator is important, a countermeasure against melting and contraction of the separator is also important to prevent the battery from overheating. Therefore, a need exists for a separator which prevents short circuits between the electrodes at high temperatures, for example, at 200° C. or higher.

SUMMARY OF THE INVENTION

The present invention provides a lithium ion secondary battery having a porous separator membrane which is not easily melted or contracted at high temperatures, thereby preventing an inter-electrode short circuit.

The present invention also provides a lithium ion secondary battery having a porous separator membrane with high permeability to lithium ions in an electrolyte solution irrespective of changes in temperature.

The present invention also provides a lithium ion secondary battery having good discharge characteristics and long cycle life.

According to one embodiment of the present invention, there is provided a lithium ion secondary battery generally comprising an electrode assembly, a container for accommodating the electrode assembly, and an electrolyte. The electrode assembly comprises two electrodes having opposite polarities, and a separator. The separator comprises a porous membrane formed by first sintering or dissolving and re-crystallizing ceramic particles. These ceramic particles preferably comprise ceramic materials having band gaps. The sintering or dissolution and re-crystallization process creates particle clusters which are then bonded together using a binder. As used, a "band gap" is a difference in energy between the valence and conduction bands in an insulator or semiconductor.

In another embodiment of the present invention, each of the particle clusters preferably takes an aciniform shape or a lamina shape. Each of the aciniform or lamina shaped particle clusters may be formed by laminating scale-like particles.

The particle clusters, which comprise ceramic particles, may be formed by various methods including chemical and physical methods. In one chemical method, the ceramic particles are dissolved in a chemical solvent. Alternatively, a portion of the surfaces of the ceramic particles are dissolved. The dissolved ceramic particles are then re-crystallized to form the particle clusters.

In a physical method, external pressure may be used. In addition, in some methods, the ceramic particles are heated to near their melting point temperature, and then subjected to a necking process.

The amount of ceramic particles used to form the particle clusters may vary, but preferably enough are used to ensure that the particle clusters take on the desired shapes. Enough of the ceramic particles are also preferably used to ensure that the particle clusters form a low density porous membrane. This low density porous membrane is formed by mixing the particle clusters with a binder and a solvent and stirring the mixture to form a porous membrane paste or a dispersive porous membrane solution.

In yet another embodiment of the present invention, the porous membrane may be coated on the surface of at least one of the two electrodes in the lithium ion secondary battery. The process for coating the porous membrane may include applying an activation material to the electrodes, applying the porous membrane solution to the resulting electrode, and baking the electrode to remove the solvent from the porous membrane solution.

In another embodiment of the present invention, the porous membrane may be deposited on the entire surface of the electrode plate by first preparing a porous membrane solution. The porous membrane solution is formed by uniformly dispersing the particle clusters in a mixed solution containing a solvent and a binder. The electrode plates, which are formed by coating the electrodes with an activation material, are then dipped in the porous membrane solution. Alternatively, the porous membrane may be deposited on the electrodes by spraying the porous membrane solution on the electrodes.

In one embodiment of the present invention, the binder material may comprise a polymer resin. The polymer resin may be an acrylate polymer, a methacrylate polymer, or an acrylate-methacrylate copolymer exhibiting heat resistance at temperatures of about 200° C. or higher.

In yet another embodiment of the present invention, the ceramic material is selected from the group consisting of zirconium oxide ($ZrO_2$), alumina ($Al_2O_3$), silica ($SiO_2$), titanium oxide ($TiO_2$), an ion-conductive glass, and combinations thereof. Preferably, the ceramic material comprises zirconium oxide ($ZrO_2$).

In addition, the ceramic material of the porous membrane preferably further comprises at least one compound selected from the group consisting of an insulating nitride compound, a hydroxide compound, a ketonic compound of zirconium (Zr), aluminum (Al), silicon (Si) or titanium (Ti), and mixtures thereof. As used, "an insulating nitride compound" excludes conductive nitride compounds such as titanium nitride (TiN), which is not suitable for use as the ceramic material in accordance with the present invention.

As described above, the ceramic material preferably comprises zirconium oxide. Zirconium oxide is well dispersed in the acrylate binder material by stirring, as measured by the zeta potential. As a result, the productivity of the ceramic material can be increased and the cost reduced. Furthermore, zirconium oxide exhibits excellent heat dissipation. Also, zirconium oxide can form pn junctions with lithium compounds at high temperatures, thereby forming diodes. In addition, zirconium oxide effectively prevents excessive amounts of lithium ions from entering the negative electrode.

In another embodiment of the present invention, each of the ceramic particles in the aciniform shaped particle clusters preferably has a diameter of about 0.01 μm to about 0.3 μm. Each of the ceramic particles in the lamina shaped particle clusters preferably takes the shape of a scale-like flake having a width of about 0.1 μm to about 1 μm. Once the particle clusters having the desired characteristics are formed, a scanning electron microscope (SEM) photograph can be taken to measure the size of the particles.

In yet another embodiment of the present invention, the ceramic material preferably has a thermal expansion rate of 0.2% or less at a temperature of about 200° C., and a thermal expansion rate ranging from about 0.1 to about 0.4% at a temperature of about 400° C. If the ceramic material has a thermal expansion rate higher than 0.2% at about 200° C. or 0.4% at about 400° C., the internal pressure of the battery increases, which pressure increase may cause the shape of the battery to deform.

In another embodiment of the present invention, the cross-sectional pore ratio of the porous membrane, which includes ceramic particle clusters and a polymer resin binder, is preferably 50% or higher. The cross-sectional pore ratio indicates the degree of porosity of an object with respect to the volumetric pore ratio of that object. More specifically, the cross-sectional pore ratio of a porous object is defined as the ratio of pore areas in a cross section of the object to the area of the cross section. The volumetric pore ratio is defined as the ratio of the volume of pores in an object to the volume of the object. The cross-sectional pore ratio of the porous membrane can be measured by first cutting the membrane, and then taking a SEM photograph of the cross-section.

As described above, the porous membrane of the present invention comprises particle clusters which may be formed by sintering the ceramic particles. As a result of the sintering process, the particle clusters are irregularly shaped. The irregular shapes of the particle clusters enable the bonding of the clusters to be controlled so as not to fill the pores created by the irregular shapes of the particle clusters. As a result of such controlled bonding, fillers comprising the ceramic material also cannot fill the pores in the porous separator membrane. In addition, the amount of the binder resin may be reduced, preventing large amounts of the binder resin from filling the pores. By these methods, the cross-sectional pore ratio of the separator is increased.

In yet another embodiment of the present invention, the ceramic material preferably has a thermal conductivity of about 10±0.5 W/(m·K) at a temperature ranging from about 500 to about 1,000° C.

In another embodiment of the present invention, the ceramic material preferably has a dielectric constant of about 1 to about 20. If the dielectric constant of the ceramic material is more than about 20, sufficient capacitance cannot be obtained. If the dielectric constant of the ceramic material is less than about 1, the material does not have a band gap, and is therefore not useful with the present invention.

In another embodiment of the present invention, the ceramic material preferably has a dielectric loss ranging from about $10^{-5}$ to about $10^{-2}$ at a frequency of 1 MHz. If the dielectric loss of the ceramic material is less than about $10^{-5}$, a predetermined band gap cannot be reproducibly obtained, making it difficult to manufacture a reliable product. If the dielectric loss of the ceramic material is more than about $10^{-2}$, sufficient capacitance cannot be obtained.

According to another embodiment of the present invention, a lithium ion secondary battery generally comprises an electrode assembly, a container for accommodating the electrode assembly and an electrolyte. The electrode assembly comprises two electrodes having opposite polarities, and a separator positioned between the two electrodes. The separator comprises a porous membrane formed by bonding particle clusters with a binder. Each particle cluster is formed by agglomeration of ceramic particles.

As used, "agglomeration" means spatially gathering, and excludes adherence using binders or other adhesives. In addition, "agglomeration" may include a partial sintering method or a method of dissolving and re-crystallizing all or a portion of the ceramic particles.

BRIEF DESCRIPTION OF THE DRAWINGS

The above and other features and advantages of the present invention will become more apparent by reference to the following detailed description when considered in conjunction with the attached drawings in which.

DETAILED DESCRIPTION

Exemplary embodiments of the present invention will now be described with reference to the accompanying drawings. An exemplary method for manufacturing an electrode assembly of a lithium ion secondary battery according to one embodiment of the present invention will also be described in detail with reference to the accompanying drawings.

Figure 1:
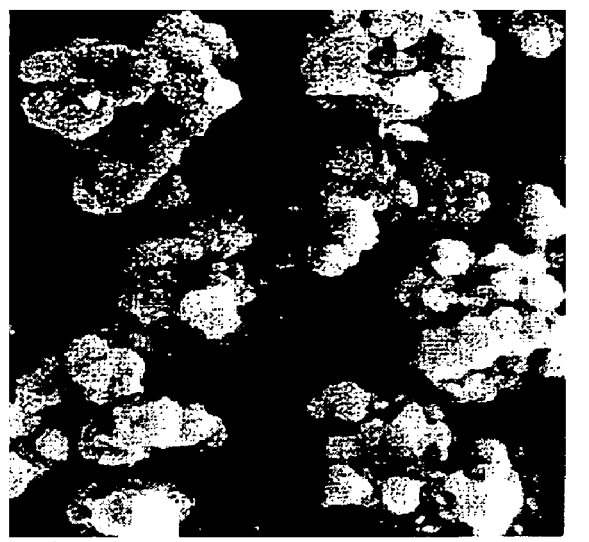
FIG. 1 is a scanning electron microscope (SEM) photograph of particle clusters according to one embodiment of the present invention.
Figure 2:
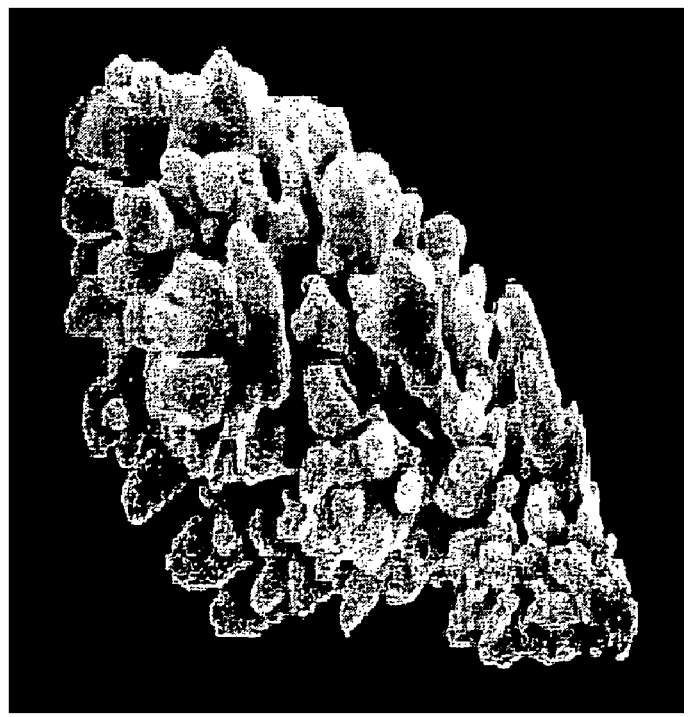
FIG. 2 is a SEM photograph of particle clusters according to another embodiment of the present invention.
Figure 3A:
FIGS. 3a and 3b are SEM photographs of scale-like ceramic particles according to one embodiment of the present invention shown at different magnifications.
Figure 3B:
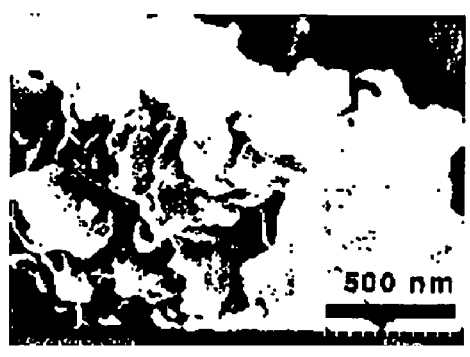

FIGS. 1 and 2 are scanning electron microscope (SEM) photographs of particle clusters of zirconium oxide particles. The zirconium oxide particles constitute the ceramic material of the porous membrane according to one embodiment of the present invention. FIGS. 3a and 3b are SEM photographs of scale-like ceramic particles shown at different magnification rates.

A method for manufacturing an electrode assembly of a lithium ion secondary battery generally comprises first forming two electrodes by applying a slurry containing a binder resin and an electrode activation material to a current collector. A porous membrane is then disposed on at least one surface of the two electrodes. The two electrodes are positioned facing each other in the battery. Finally, the two electrodes are assembled into the electrode assembly such that the porous membrane is disposed between the two electrodes.

The electrode assembly may comprise a jelly-roll type construction, wherein the two laminated electrodes are wound together, and the porous membrane is disposed on the outer surface of at least one of the electrodes. In this configuration, when the electrodes are wound together, the porous membrane disposed on the surface of at least one of the electrodes separates the two electrodes. Alternatively, the porous membrane may be disposed on the inner surface, or on both the outer and inner surfaces of either one or both of the electrodes.

In an alternative embodiment, the electrodes are dipped in a porous membrane solution. Such a solution may be formed by uniformly dispersing the particle clusters in a solution containing a binder and a solvent. The porous membrane can be disposed on the entire surface of each electrode. By this construction, it is possible to effectively prevent a short circuit between the electrode on which the porous membrane is disposed and the other electrode.

In this embodiment, the electrodes of the secondary battery may be formed according to any known method. For example, an activation material slurry containing a binder and an activation material powder is first applied on at least one surface of a metal foil or a metal mesh current collector preferably comprising copper or aluminum.

Suitable copper current collectors comprise copper foils having thicknesses of about 10 to about 15 μm. The activation material slurry is applied on both surfaces of the foil. The activation material slurry is formed by mixing an activation material, such as graphite and active carbon, with a binder material, such as polyvinylidene fluoride (PVdF). Since the graphite and active carbon are conductive materials, an additional conductive material is generally not needed.

Suitable aluminum current collectors comprise aluminum meshes having thicknesses of about 20 μm. The activation material slurry comprises activation material powder containing a lithium compound, such as lithium cobalt oxide, lithium peroxide and/or lithium nickel oxide, a conductive material, and a binder. The activation material slurry is coated on a surface of the aluminum mesh.

In order to form the activation material slurry, a suitable amount of solvent, for example, acetone, is used to dissolve the binder. The solvent is removed by baking after coating the activation material slurry.

After coating, the electrode is pressed with a roller. The layer of activation material coating has a uniform thickness of about 100 μm.

In this embodiment, the porous membrane is not formed as a separate film, but rather is coated on the electrodes. The porous membrane is formed by applying a porous membrane solution or a porous membrane precursor to at least one surface of at least one of the electrodes on which the activation material slurry is coated. If a porous membrane solution is used, the solvent is removed from the porous membrane solution after application to the electrode surface. When a porous membrane precursor is used, the precursor is cured after application of the precursor to the electrode surface.

More specifically, the porous membrane is formed by first preparing a solution containing the binder material, the solvent, and the ceramic powder. The solution is then applied on the entire surface of the desired electrode surface by a printing method or a spraying method. In this embodiment, the porous membrane is formed by dipping the electrode into the solution, adjusting the thickness of the membrane with a gravure roller, and baking the resultant electrode.

For example, a powder of particle clusters containing zirconium oxide and an acryl resin comprising methacrylate were mixed at a mixing ratio of 96:4 wt %. The resultant mixture was diluted with a solvent to obtain a solution having a viscosity of 3,000 cps. The surface of the electrode was coated with the mixture solution by using the dipping method. The electrode was dried at a temperature of 120° C. in a drying apparatus, to remove the solvent. As a result, the porous membrane was formed on the surface of the electrode.

This example is presented for illustrative purposes only, and it is understood that the porous membrane may be formed by various other methods.

The porous membrane according to the present invention is constructed by bonding aciniform shaped particle clusters or lamina shaped particle clusters with a binder to obtain a desired porosity of the membrane. The aciniform shaped particle clusters are formed by agglomeration of ceramic particles. Each of the ceramic particles preferably has a diameter of about 0.01 to about 0.3 µm. The lamina shaped particle clusters are formed by sintering and laminating a portion of the ceramic particles, each of which ceramic particles have the shape of a scale or flake. Each of the flake shaped ceramic particles preferably has a width of about 0.1 µm to about 1 µm. The porous membrane comprising the particle clusters may have a thickness ranging from about 1.5 to about 30 µm.

The particle clusters may be formed either by sintering or by dissolving all or a portion of the ceramic particles and then re-crystallizing the resulting product. When the ceramic particles are dissolved and re-crystallized, they agglomerate, forming the particle clusters, which are then obtained by extraction.

Figure 4:
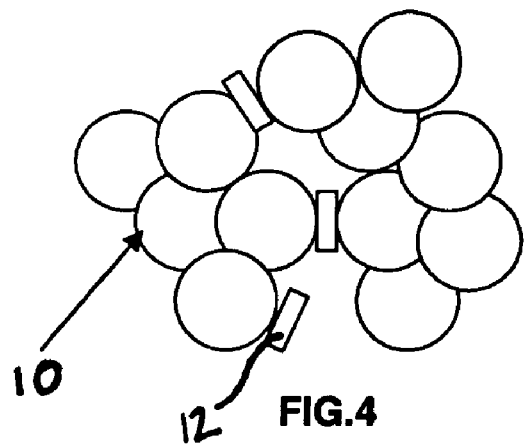
FIG. 4 is a schematic view of bonded particle clusters according to one embodiment of the present invention.

The porous membrane solution is then formed by first mixing a powder of the particle clusters with a binder and a solvent. If the binder surrounds the entire surface of each particle cluster, and the particle clusters are bonded to each other with the binder, and if the ion conductivity of the binder is low, then the ion conductivity of the particle clusters and, consequently, of the porous membrane, may be low. In order to ensure a high ion conductivity of the porous membrane irrespective of the ion conductivity of the binder, the binder is preferably disposed on only a portion of each particle cluster 10, forming bridge-like bonds 12, as shown in FIG. 4. As shown, the particle clusters 10 are connected by the bridge-like bonds 12, thereby ensuring high ion conductivity of the porous membrane.

According to the present invention, a slurry used for forming the porous membrane preferably includes a small amount of binder material. The weight ratio of the ceramic material and the binder material in the porous membrane preferably ranges from about 98:2 to about 85:15 to prevent the binder from entirely surrounding the particle clusters. As a result, it is possible to prevent the reduction in ion conductivity of the fillers due to the surrounding binder.

In one embodiment, the particle clusters are formed by partially sintering the ceramic particles. This partial sintering process comprises heating the ceramic particles, such as zirconium oxide, at a temperature of about 900° C. for about 10 minutes. The partially sintered ceramic material is then completely dissolved in a solvent capable of dissolving the ceramic material. Alternatively, the powder of the partially sintered ceramic particles is partially dissolved in a solvent. The partially sintered ceramic particles are then re-extracted by removing the solvent, thereby forming the particle clusters.

In the porous membrane according to the present invention, there are pores in the ceramic particles, there are pores between the ceramic particles in the particle clusters, and there are pores provided by the binder between the particle clusters. Each of these pores increases the cross-sectional pore ratio of the porous membrane. These pores also increase the permeability of the porous membrane to the electrolyte solution and increase the ion conductivity of the porous membrane to the lithium ions.

In the present invention, the cross-sectional pore ratio of the porous membrane is preferably 50% or more. In order to ensure that the cross-sectional pore ratio of the porous membrane is 50% or more, the binder is preferably present in the porous membrane in an amount of 20% or less. In addition, the binder is not expansible. More specifically, the binder has a low expansibility to the electrolyte solution. Non-limiting examples of suitable binders for use with the present invention include acrylate resin binders. In addition to having low expansibility to the electrolyte solution, acrylate resin binders have excellent adhesiveness.

In addition, the binder is uniformly dispersed, thereby reducing the amount of binder needed. However, the process for uniformly dispersing the binder is very difficult. Accordingly, a porous membrane having a high cross-sectional pore ratio is difficult to obtain. In the present invention, the partially sintered ceramic particle clusters are used as fillers so that the acrylate resin binder is easily dispersed. As a result, a porous membrane having a high cross-sectional pore ratio is obtained with a small amount of binder material.

The two electrodes, on at least one of which the porous membrane is coated, are wound together. Since the porous membrane serves a separator, it is not necessary to provide an additional separator between the two electrodes. In this configuration, although there is no separator to shut down in order to block current flow when the battery is overcharged or overheated, the porous membrane functions to block the ion flow. More specifically, when the battery is overcharged or overheated, lithium ions are extracted by the portions of the porous membrane that are poorly adhered to the electrodes. Therefore, although the electrodes may be in contact with each other at the points where the porous membrane is poorly adhered to the electrodes, the extraction of lithium ions by the porous membrane blocks the current flow. In addition, when the battery is overheated, a pn junction diode-like structure is formed between the ceramic material and the lithium-containing material. Therefore, the porous membrane, like a separator, functions to block the current flow, thereby ensuring the safety of the battery.

In addition, an insulating film comprising a polyolefin resin may be provided between the two electrodes. The polyolefin resin insulating film together with the porous membrane serve as the separator in the lithium ion secondary battery.

The inventive method for manufacturing the separator by disposing a porous membrane on the surface(s) of the electrode has several advantages over conventional methods which use an additional separator.

In the conventional methods which use an additional separator, the separator is laminated on the two electrodes and the resulting product is wound to form an electrode assembly. According to these conventional methods for forming the electrode assembly, the separator and the electrodes may be misaligned, increasing the possibility of a short circuit between the electrodes. However, no misalignment occurs in the formation of the electrode assembly according to the present invention because the separator is coated on the electrodes and is formed together with the electrodes. Therefore, the method according to the present invention does not require an alignment process.

In addition, when the battery is overheated, the separator used in the conventional methods may become contracted, increasing the possibility of a short circuit between the electrodes. Because the separator according to the present invention is coated on the electrodes, the separator does not contract due to the adhering force between the separator and the electrode. Therefore, a short circuit cannot occur between the electrodes when the battery is overheated. In addition, unlike the battery prepared according to the conventional methods, in the battery according to the present invention, the possibility of damaging the battery during manufacturing is reduced.

Just like the electrical resistance of a resistor is inversely proportional to the length of the resistor, the ion conductivity of the separator is inversely proportional to the thickness of the separator. Accordingly, the thinner the separator, the greater the battery power. According to the present invention, a thin separator can be formed, making it possible to manufacture a battery with increased power. In addition, by adhering the porous membrane to the surface of the electrode(s), the separator according to the present invention is integral with the electrode. Therefore, the separator need not have high mechanical strength to endure stress during battery manufacturing. Accordingly, the separator can comprise a flexible material without limiting the strength of the separator.

In the present invention, silica, aluminum oxide ($\alpha$-alumina) and zirconium oxide are preferably used as the ceramic particles of the porous membrane. Since these ceramic materials are not substantially deteriorated at high temperatures, porous membranes comprising these ceramic materials cannot be contracted or melted at high temperatures, for example, temperatures of about 300° C. Therefore, a short circuit between the electrodes is prevented. In addition, these ceramic materials can increase the stability of the separator. Also, the partially sintered particle clusters of the porous membrane increase the cross-sectional or volumetric pore ratio of the porous membrane.

A lithium ion secondary battery according to the present invention is formed by placing the electrode assembly formed according to the above described methods into a can-type container. The can-type container is hermetically sealed with a cap assembly. The electrolyte solution is injected through an injection hole in the cap assembly, and the injection hole is then sealed. According to the present invention, the cross-sectional pore ratio of the porous membrane in the electrode assembly is high. Therefore, the rate of injection of the electrolyte solution is much faster than, and can be twice as fast as, that of the conventional methods using polyolefin separators.

The partially sintered ceramic materials of the present invention increase the heat resistance of the separator, thereby preventing damage to the separator and preventing a short circuit between the electrodes upon overheating of the battery.

In addition, the bonding of the partially sintered ceramic particle clusters with the small amount of binder according to the present invention increases the ion conductivity of the battery, as well as the capacitance and efficiency of the battery.

In addition, because the separator according to the present invention is integral with the electrode(s), misalignment does not occur between the separator and the electrodes. Also, the separator according to the present invention can be thin, thereby increasing the amount of discharged activation material and increasing the electrical capacitance of the battery.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of this invention. Accordingly, the foregoing description should not be read as pertaining only to the precise structures described and illustrated in the accompanying drawings, but rather should be read consistent with and as support for the following claims which are to have their fullest and fairest scope.

What is claimed is:

1. A lithium ion secondary battery comprising:
    an electrode assembly comprising:
        first and second electrodes having opposite polarities, and
        a separator comprising a porous membrane, the porous membrane comprising clusters of ceramic particles and a binder, wherein the ceramic particles comprise a ceramic material having a band gap, the ceramic particles are present in an amount greater than an amount of the binder, and the porous membrane has a cross-sectional pore ratio of about 50% or greater, wherein the binder comprises a polymer resin selected from the group consisting of acrylate polymers, methacrylate polymers and acrylate-methacrylate co-polymers and having heat resistance at a temperature of about 200° C. or greater;
    a container for accommodating the electrode assembly, wherein the first and second electrodes are positioned facing each other; and
    an electrolyte.

2. The lithium ion secondary battery according to claim 1, wherein each of the clusters of ceramic particles has a shape selected from the group consisting of aciniform and laminae.

3. The lithium ion secondary battery according to claim 1, wherein the ceramic material is selected from the group consisting of silica ($SiO_2$), alumina ($Al_2O_3$), zirconium oxide ($ZrO_2$), titanium oxide ($TiO_2$) and mixtures thereof.

4. The lithium ion secondary battery according to claim 1, wherein the ceramic material is selected from the group consisting of insulating nitride compounds of silicon (Si), hydroxide compounds of silicon (Si), alkoxy compounds of silicon (Si), ketonic compounds of silicon (Si), insulating nitride compounds of aluminum (Al), hydroxide compounds of aluminum (Al), alkoxy compounds of aluminum (Al), ketonic compounds of aluminum (Al), insulating nitride compounds of titanium (Ti), hydroxide compounds of titanium (Ti), alkoxy compounds of titanium (Ti), ketonic compounds of titanium (Ti), insulating nitride compounds of zirconium (Zr), hydroxide compounds of zirconium (Zr), alkoxy compounds of zirconium (Zr), ketonic compounds of zirconium (Zr), and mixtures thereof.

5. The lithium ion secondary battery according to claim 1, wherein the separator further comprises a polyolefin-based resin membrane.

6. The lithium ion secondary battery according to claim 1, wherein the separator consists essentially of the porous membrane.

7. The lithium ion secondary battery according to claim 1, wherein the porous membrane is disposed on at least one surface of at least one of the first and second electrodes.

8. The lithium ion secondary battery according to claim 7, wherein the porous membrane is disposed on the at least one surface of the at least one electrode by dipping the electrode in a solution comprising a solvent, a binder and the clusters of ceramic particles.

9. The lithium ion secondary battery according to claim 7, wherein the porous membrane is disposed on the at least one surface of the at least one electrode by spraying a solution comprising a solvent, a binder and the clusters of ceramic particles on the at least one electrode.

10. The lithium ion secondary battery according to claim 7 wherein the porous membrane is disposed on the at least one electrode by printing a solution comprising a solvent, a binder and the clusters of ceramic particles on the entire surface of the electrode.

11. The lithium ion secondary battery according to claim 2, wherein each of the particle clusters has the aciniform shape, and each of the ceramic particles in the cluster has a diameter of about 0.01 to about 0.3 μm.

12. The lithium ion secondary battery according to claim 2, wherein each of the particle clusters has the shape of a lamina, and each of the ceramic particles has a shape of a scale or flake having a width of about 0.1 μm to about 1 μm.

13. The lithium ion secondary battery according to claim 1, wherein the porous membrane has a thickness of about 1.5 to about 30 μm.

14. The lithium ion secondary battery according to claim 1, wherein the ceramic material has a thermal expansion rate of about 0.2% or less at a temperature of about 200° C., and a thermal expansion rate of about 0.1 to about 0.4% at a temperature of about 400° C.

15. The lithium ion secondary battery according to claim 1, wherein the ceramic material has a thermal conductivity ranging from about 10+0.5 W/(m·K) to about 10−0.5 W/(m·K) at a temperature ranging from about 500 to about 1,000° C.

16. The lithium ion secondary battery according to claim 1, wherein the ceramic material has a dielectric loss of about $10^{-5}$ to about $10^{-2}$ at a frequency of about 1 MHz.

17. The lithium ion secondary battery according to claim 1, wherein the weight ratio of the ceramic material to the binder in the porous membrane ranges from about 98:2 to about 85:15.

18. The lithium ion secondary battery according to claim 1, wherein each particle cluster comprises at least three ceramic particles.

* * * * *